(12) United States Patent
Blake

(10) Patent No.: US 7,199,344 B2
(45) Date of Patent: Apr. 3, 2007

(54) ACTIVE CAMOUFLAGE USING REAL-TIME SPECTRAL MATCHING

(75) Inventor: Pamela L. Blake, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/078,958

(22) Filed: Mar. 11, 2005

(65) Prior Publication Data

US 2007/0034774 A1 Feb. 15, 2007

(51) Int. Cl.
*G01J 1/32* (2006.01)
*A63G 31/00* (2006.01)
*A63J 5/02* (2006.01)

(52) U.S. Cl. .................. 250/205; 250/208.1; 472/61

(58) Field of Classification Search ............. 250/214.1, 250/214 R, 205, 208.1; 472/61, 71, 72, 57, 472/65, 75, 77, 81
See application file for complete search history.

(56) References Cited

U.S. PATENT DOCUMENTS

| 4,142,015 | A | | 2/1979 | Bienz |
| 4,156,033 | A | | 5/1979 | Bienz |
| 4,615,921 | A | | 10/1986 | Johanssen |
| 5,077,101 | A | | 12/1991 | Conway |
| 5,220,631 | A | | 6/1993 | Grippin |
| 5,307,162 | A | | 4/1994 | Schowengerdt |
| 5,734,495 | A | | 3/1998 | Friedman |
| 5,754,571 | A | * | 5/1998 | Endoh et al. .................. 372/20 |
| 6,459,076 | B1 | * | 10/2002 | Schlenker .................... 250/205 |
| 2004/0036006 | A1 | * | 2/2004 | Dowling ..................... 250/205 |

\* cited by examiner

*Primary Examiner*—Stephone B. Allen
*Assistant Examiner*—Suezu Ellis
(74) *Attorney, Agent, or Firm*—Candy & Lortz LLP; Bradley K. Lortz

(57) ABSTRACT

An invention is provided for concealing an object. The invention includes a plurality of electromagnetic radiation sources that generate an electromagnetic radiation spectrum, and a controller in communication with the plurality of electromagnetic radiation sources. The controller includes logic that compares the electromagnetic radiation spectrum generated from the plurality of electromagnetic radiation sources with an electromagnetic radiation spectrum from an environment surrounding the object. In operation, the controller adjusts the plurality of electromagnetic radiation sources to generate an electromagnetic radiation spectrum that matches the electromagnetic radiation spectrum of the environment surrounding the object.

20 Claims, 4 Drawing Sheets

ACTIVE CAMOUFLAGE USING REAL-TIME SPECTRAL MATCHING

BACKGROUND OF THE INVENTION

1. Field of the Invention

This invention relates generally to camouflage techniques, and more particularly to real time active spectral matching camouflage.

2. Description of the Related Art

Camouflage is a technique for concealment, which involves disguising an object, in plain sight, in order to hide it from something or someone. Historically, camouflage has been designed to match colors, contours, and/or patterns of the camouflage to a background. For example, in times of conflict soldiers often wear special camouflage clothing to become less visible. Such camouflage may be placed between the viewer and the concealed object, or may be applied directly to the object itself.

Another type of camouflage is the creation of decoys. Most camouflage is designed to make an object appear to blend with its surroundings. In the case of decoys, the purpose of the camouflage is not to make the object "disappear" into the surroundings, but instead to make the camouflaged object appear to be another type of object. For example, in England prior to the D-Day invasion fake plywood "planes" were utilized to create the illusion of a large air force. Thus, it should be noted that "decoys" are a type of camouflage and are subsumed in the general category of camouflage.

Traditionally, military camouflage had to match the background only well enough to fool the human eye. As a result, military camouflage was only required to provide a good match over the narrow segment of the electromagnetic spectrum visible to the human eye. Hence, a few generic types of camouflage such as "Desert," "Jungle," or "Forest" were often sufficient to deceive human observers.

However, traditional camouflage techniques suffer from a number of basic defects. First, traditional camouflage is not adaptable to changes in the surroundings, requiring a different type of traditional camouflage for each different type of background. Second, traditional camouflage is passive in nature. That is, the signals that traditional camouflage returns to the observer are a function of angle of incidence, the source of illumination, and the composition of materials in the camouflage. Consequently, changes in conditions such as angle or amount of illumination may make the camouflage far less effective. Third, the reflective spectrum of traditional camouflage generally is not a good match to the surroundings. Before the advent of multispectral and hyperspectral remote-sensing techniques, matching the electromagnetic spectrum of the surroundings within the resolution of the human eye was sufficient. Today, with modern remote-sensing tools, differences between the spectrum of the surroundings and the spectrum of the camouflage are readily detectable even when undetectable to the human eye.

Many approaches have been proposed or implemented to address some of these defects in traditional camouflage systems. Most advanced military powers are well aware of the power of remote sensing, and have taken steps to improve their camouflage to minimize detectability across a wider spectrum. For example, U.S. Pat. Nos. 4,142,015 and 4,156,033 issued to Bienz (1979) provide a means of providing a varying degree of insulation to conceal radiation in the infrared region of the spectrum. U.S. Pat. No. 4,615,921 issued to Johanssen (1986) describes a plastic film that is matched to the thermal characteristics of particular surroundings. U.S. Pat. No. 5,077,101 issued to Conway, et al, (1991) describes a three-layer system designed to have different reflectances in different ranges of the spectrum.

These and other approaches to providing a better match to a given background all increase the concealing power of camouflage. None of these approaches resolves the fundamental problems cited above, however. That is, all of these approaches require a different camouflage for different backgrounds; are not active in nature; and are still unlikely to provide a tight enough spectral match to fool multispectral or hyperspectral remote-sensing instruments.

The problem of passive response to changing angles of incidence or changes in the assumed position of the observer has been addressed by U.S. Pat. No. 5,734,495 issued to Friedman (1998). In Friedman, the camouflage includes at least one set of movable surfaces that may be rotated to change the angle of incidence or expose increased surfaces of different camouflage materials with different reflective properties. This approach offers a higher degree of flexibility in dealing with the angle of the viewer. It also allows the spectral signature of the sum total of the camouflage to be adjusted to provide better matches to the surroundings. Unfortunately, the spectral signature must be constructed out of the limited palette of reflective surfaces that are built into the camouflage system.

Further approaches projecting light around an object such that what is behind the object is seen by an observer from the front. The first of these, U.S. Pat. No. 5,220,631 issued to Grippin (1993), employs fiber-optic cables and lenses to receive light from behind the concealed object and pipe it to the front of the object. Such a device might be fairly effective in deceiving a human observer, but a number of characteristics of the system would make it easily observable to instruments measuring spectral properties. Fiber-optic cables themselves, being composed of glass or plastic, have readily detectable spectral signatures. Although fiber-optics have excellent clarity, there is a degree of differential transmission of wavelengths of light through a fiber, so that the spectrum of the background after coming through the cables is likely to be measurably different from the spectrum of the surroundings. Finally, the approach is limited to the range of light energy readily transmitted by fiber optics; many of the devices used to detect camouflaged objects operate outside this wavelength range.

The second approach is that of U.S. Pat. No. 5,307,162 issued to Schowengerdt (1992). Schowengerdt discloses a cloaking system using optoelectronically controlled camouflage that interposes a shield between the viewer and the concealed object. On the outward surface of the shield is a "nonspecular display surface" that projects an image of the background (or any other desired image). This display screen is fed by a "fiber optic data bus." The Schowengerdt reference suffers from all of the limitations of U.S. Pat. No. 5,220,631 cited above. Moreover, the Schowengerdt reference concedes that it is designed to operate in the visible light spectrum, and would therefore not provide concealment from standard military remote sensing instruments (or radar). In addition, the stated purpose of the patent is to provide an "image" rather than to match the detailed spectral properties for which camouflage-detection instruments search.

In view of the forgoing, there is a need for a camouflage system that provides a fully adaptive technique across the broad spectral range typical of current camouflage-detecting sensors. The camouflage system should be adaptable to changes in the surroundings, and active in nature. Further, the reflective spectrum of the camouflage system should match the reflective spectrum of the surrounding area.

SUMMARY OF THE INVENTION

Broadly speaking, embodiments of the present invention provide an active camouflage system that is adaptable to changes in the surroundings, including changes in the background, and changes in the illumination conditions. In one embodiment, a system for concealing an object is disclosed. The system includes a plurality of electromagnetic radiation sources that generate an electromagnetic radiation spectrum, and a controller in communication with the plurality of electromagnetic radiation sources. The controller includes logic that compares the electromagnetic radiation spectrum generated from the plurality of electromagnetic radiation sources with an electromagnetic radiation spectrum from an environment surrounding the object. In operation, the controller adjusts the plurality of electromagnetic radiation sources to generate an electromagnetic radiation spectrum that matches the electromagnetic radiation spectrum of the environment surrounding the object. To this end, the system can include a camouflage sensor in communication with the controller that monitors the intensity at selected wavelengths of the electromagnetic radiation spectrum generated from the plurality of electromagnetic radiation sources. A surroundings sensor can also be included that monitors the intensity at selected wavelengths of the electromagnetic radiation spectrum received from the environment surrounding the object. The controller then adjusts each electromagnetic radiation source responsible for a particular wavelength to match the corresponding wavelength received from the surroundings sensor. Multiple devices can be utilized as electromagnetic radiation sources, such as lamps of adjustable intensity with multiple filters, heating elements of adjustable intensity with multiple filters, light sources with an interference pattern, tunable lasers, light sources with a hologram, or any other electromagnetic radiation source as will be apparent to those skilled in the art after a careful reading of the present disclosure.

In a further embodiment, a method is disclosed for concealing an object. The method includes generating a camouflage electromagnetic radiation spectrum and receiving a surroundings electromagnetic radiation spectrum from an environment surrounding the object. The camouflage electromagnetic radiation spectrum is compared with the surroundings electromagnetic radiation spectrum, and the camouflage electromagnetic radiation spectrum is adjusted to match the surroundings electromagnetic radiation spectrum. Similar to above, the intensity at selected wavelengths of the camouflage electromagnetic radiation spectrum can be sensed using a camouflage sensor, and the intensity at selected wavelengths of the surroundings electromagnetic radiation spectrum can be sensed using a surroundings sensor. The intensity at each selected wavelength in the camouflage electromagnetic radiation spectrum is decreased when the intensity at the selected wavelength is greater than the intensity at a corresponding wavelength in the surroundings electromagnetic radiation spectrum. Conversely, the intensity at each selected wavelength in the camouflage electromagnetic radiation spectrum is increased when the intensity at the selected wavelength is less than the intensity at a corresponding wavelength in the surroundings electromagnetic radiation spectrum.

A further system for concealing an object is disclosed in an additional embodiment of the present invention. The system includes a means for generating an electromagnetic radiation spectrum, and a means for comparing the generated electromagnetic radiation spectrum with an electromagnetic radiation spectrum from an environment surrounding the object. In addition, a means for adjusting the generated electromagnetic radiation spectrum to match the electromagnetic radiation spectrum of the environment surrounding the object is included. As above, a camouflage sensor can be included that monitors an intensity at selected wavelengths of the generated electromagnetic radiation spectrum, and a surroundings sensor can be included that monitors an intensity at selected wavelengths of the electromagnetic radiation spectrum received from the environment surrounding the object. In this manner, each means for generating electromagnetic radiation responsible for a particular wavelength can be adjusted to match the corresponding wavelength received from the surroundings sensor. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for an active camouflage system that is adaptable to changes in the surroundings, including changes in the background, and changes in the illumination conditions. Further, embodiments of the present invention provide a camouflage process that is adaptive across a broad spectral range, beyond the range of the human eye. As a result, embodiments of the present invention provide an "active" camouflage process that is capable of detailed spectral matching to the surroundings and adapts instantly to new surroundings by changing the observed spectrum of the camouflage automatically in response to changes in the surroundings. Moreover, embodiments of the present invention provide a camouflage process that is capable of detailed spectral matching to the surroundings across a wide wavelength range that can interfere with detection by modern multispectral and hyperspectral sensors.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The active camouflage of the embodiments of the present invention operates with sources of electromagnetic radiation that are controlled to match the spectrum seen by an observer or an observing sensor with the spectrum of surrounding materials or a selected decoy material. Broadly speaking, embodiments of the present invention conceal an object by projecting electromagnetic radiation outward. This electromagnetic spectrum is then compared by the active camouflage with the spectrum of the surroundings or decoy material. The radiation from the source is then adjusted upward or downward until the spectrum of the emitted radiation matches the spectrum of the surrounding material or decoy material.

Figure 1:
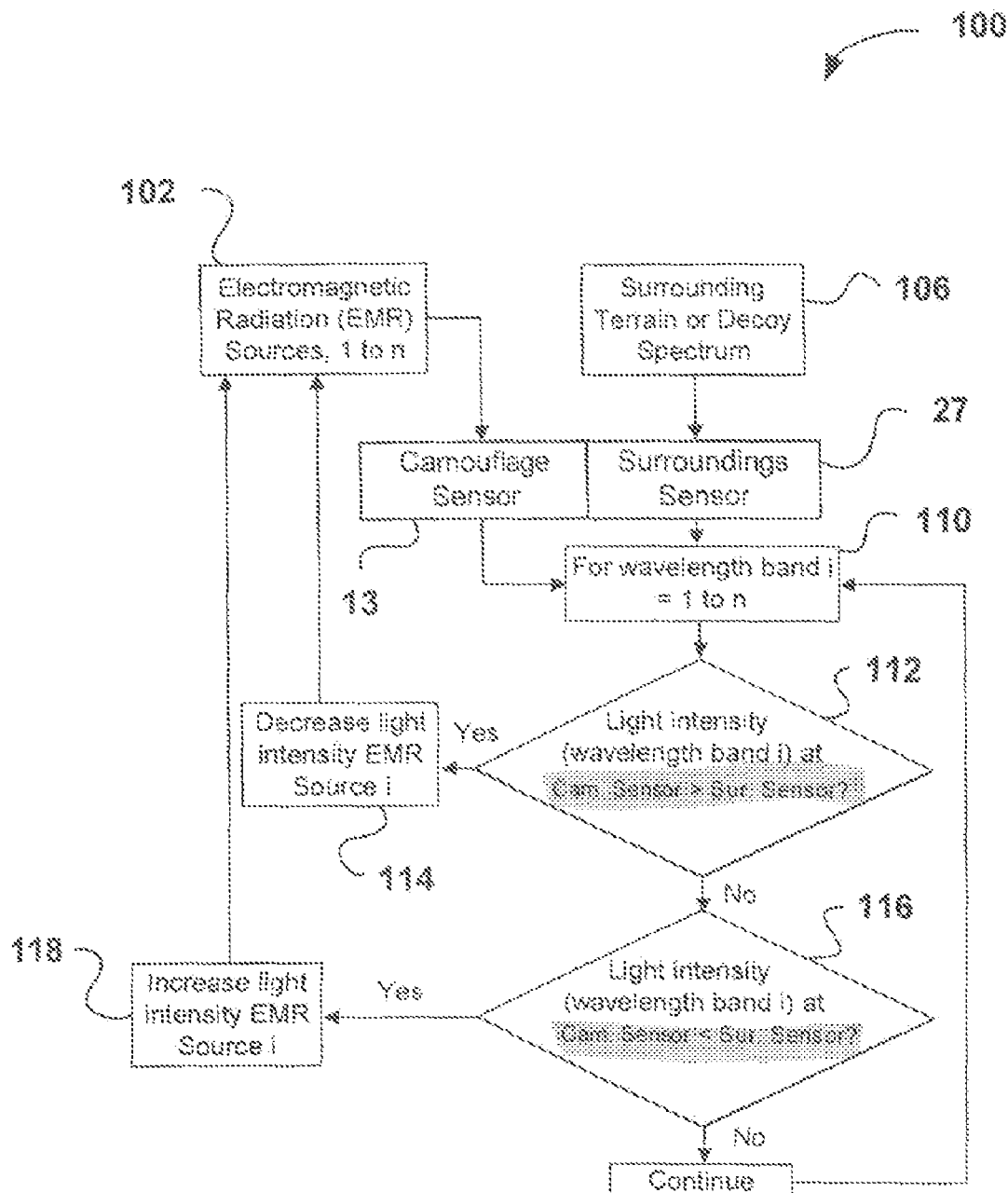
FIG. 1 is a flowchart showing a method for providing real-time active spectral matching camouflage, in accordance with an embodiment of the present invention.

FIG. 1 is a flowchart showing a method 100 for providing real-time active spectral matching camouflage, in accordance with an embodiment of the present invention. In operation 102, electromagnetic radiation is emitted from a plurality of controllable electromagnetic radiation sources, each operating in selected wavelength bands, to form a camouflage. The electromagnetic radiation is received at a camouflage sensor 13, which monitors the brightness in each wavelength band, as illustrated next with reference to FIG. 2.

Figure 2:
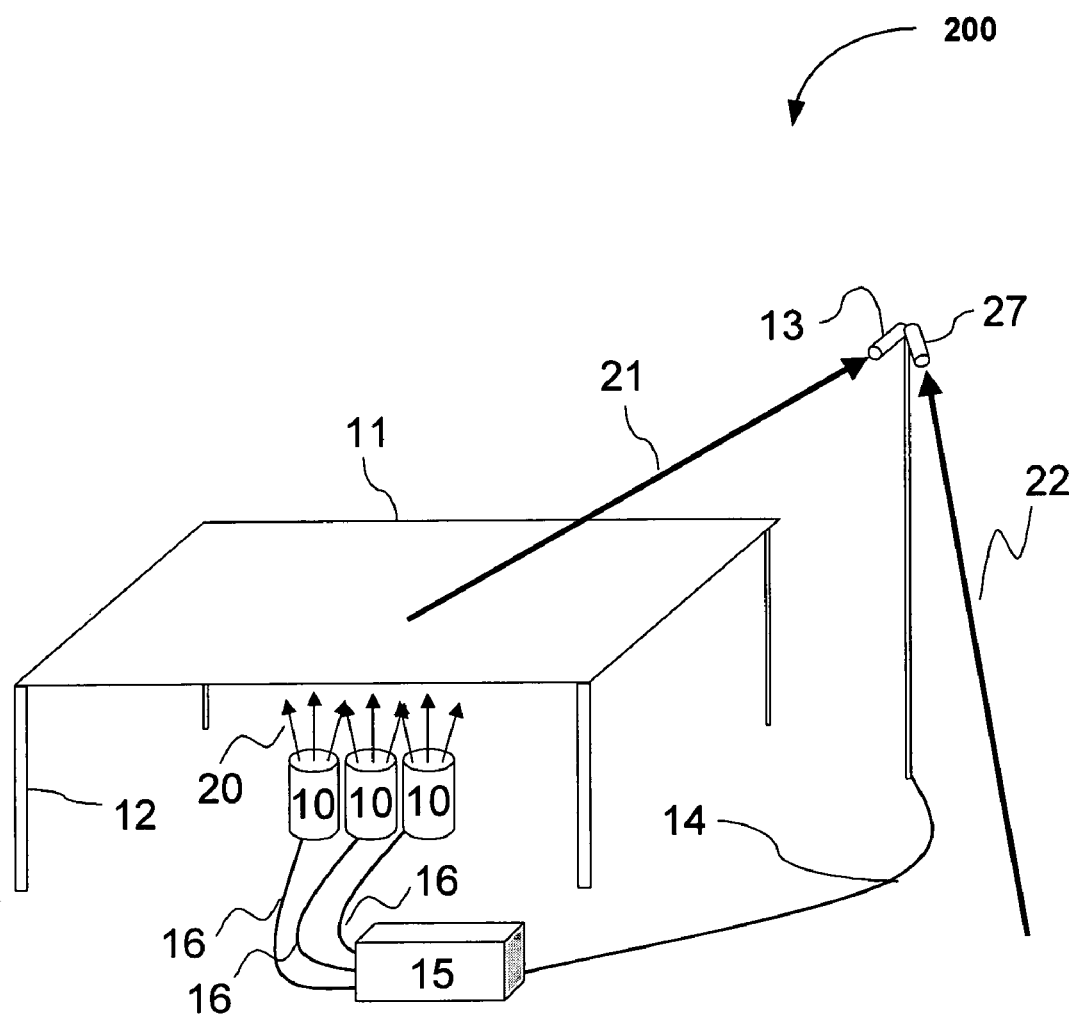
FIG. 2 is a diagram showing an exemplary real-time active spectral matching camouflage system 200, in accordance with an embodiment of the present invention.

FIG. 2 is a diagram showing an exemplary real-time active spectral matching camouflage system 200, in accordance with an embodiment of the present invention. The exemplary real-time active spectral matching camouflage system 200 includes a plurality of controllable electromagnetic radiation sources 10, a diffuser screen 11 with support poles 12, a camouflage sensor 13 aimed at the camouflage system, a surroundings sensor 27 aimed at the surroundings, and a controller 15 coupled to the camouflage sensor 13 and the surroundings sensor 27 via connecting cord 14. The controller 15 is further coupled to the controllable electromagnetic radiation sources 10 via cables 16.

The exemplary real-time active spectral matching camouflage system 200 illustrates a simple implementation of the embodiments of the present invention, demonstrating a case with three wavelength bands. In operation, radiation in each selected wavelength band is emitted from one of three controllable radiation sources 10 and then spread out by a mesh screen diffusor 11 supported on poles 12. The emitted radiation 21 is received at the camouflage sensor 13, which generates signals of the received intensity for each wavelength band (in this case, three of them, corresponding to the bands emitted by the radiation sources 10) that are carried via electric cable 14 to the controller 15.

Referring back to FIG. 1, in operation 106, electromagnetic radiation is received from the surrounding terrain or decoy spectrum, using a surroundings sensor 27. The surroundings sensor 27 monitors the total radiation received in the wavelength band of each corresponding wavelength band in the surroundings whose spectral signature is being mimicked. As illustrated in FIG. 2, radiation from the surroundings 22 is received at the surroundings sensor 27, which can be identical in structure to the camouflage sensor 13. The surroundings sensor 27 generates signals of the received intensity for each wavelength band (in this case again three of them, corresponding to the bands emitted by the radiation sources 10) that are carried via electric cable 14 to the controller 15.

Turning back to FIG. 1, for each wavelength band, the brightness of the radiation received at the camouflage sensor 13 is compared to the brightness received at the surroundings sensor 27, in operation 110. If the brightness for a given wavelength band at the camouflage sensor 13 is greater than the brightness of that same wavelength band at the surroundings sensor 27, the method 100 branches to operation 114. Otherwise, the method 100 continues to operation 116.

In operation 114, the radiation emission from the corresponding source of radiation is decreased. As shown in FIG. 2, the controller 15 compares the intensity of the signal received from the camouflage 21 via the camouflage sensor 13 in each band with the signal received from the surroundings 22 (or from decoy spectrum) via the surroundings sensor 27 in each corresponding band. For each band, if the intensity of the signal from the camouflage sensor 13 is greater than the corresponding signal for the surroundings sensor 27, then the intensity of radiation emitted from the controllable electromagnetic radiation source 10 responsible for emitting in that band is reduced via a signal through the appropriate cable 16.

In operation 116 of FIG. 1, if the brightness for a given wavelength band at the camouflage sensor 13 is less than the brightness of that same wavelength band at the surroundings sensor 27, the method 100 branches to operation 118. Otherwise, the method loops back to operation 110. In operation 114, the radiation emission from the corresponding source of radiation is increased. As mentioned above with reference to FIG. 2, the controller 15 compares the intensity of the signal received from the camouflage 21 via the camouflage sensor 13 in each band with the signal received from the surroundings 22 (or from decoy spectrum) via the surroundings sensor 27 in each corresponding band. For each band, if the intensity of the signal from the camouflage sensor 13 is less than the corresponding signal for the surroundings sensor 27, then the intensity of radiation emitted from the controllable electromagnetic radiation source 10 responsible for emitting in that band is increased via a signal through the appropriate cable 16.

When the detected brightness at the camouflage sensor 13 and surroundings sensor 27 are the same within acceptable tolerances, no further adjustments are made. At this point the spectra received from both the camouflage and the surroundings are the same within the resolution of the wavelength bands employed. The more discrete wavelength bands employed, the more precise the degree of match between the camouflage and the surroundings.

By this process, the spectrum emitted from the camouflage can be adjusted to match the spectrum of the surroundings. If employed as a decoy, the spectrum emitted from the diffusor screen is adjusted to match the spectrum of the desired decoy material by exposing the second sensor 27 to the desired spectrum. Moreover, the spectrum emitted from the camouflage will be adjusted continuously as the spectrum of the surroundings change in response to temperature, sun angle, weather, or other factors. The system thus has the advantage of being self-calibrating.

Figure 3:
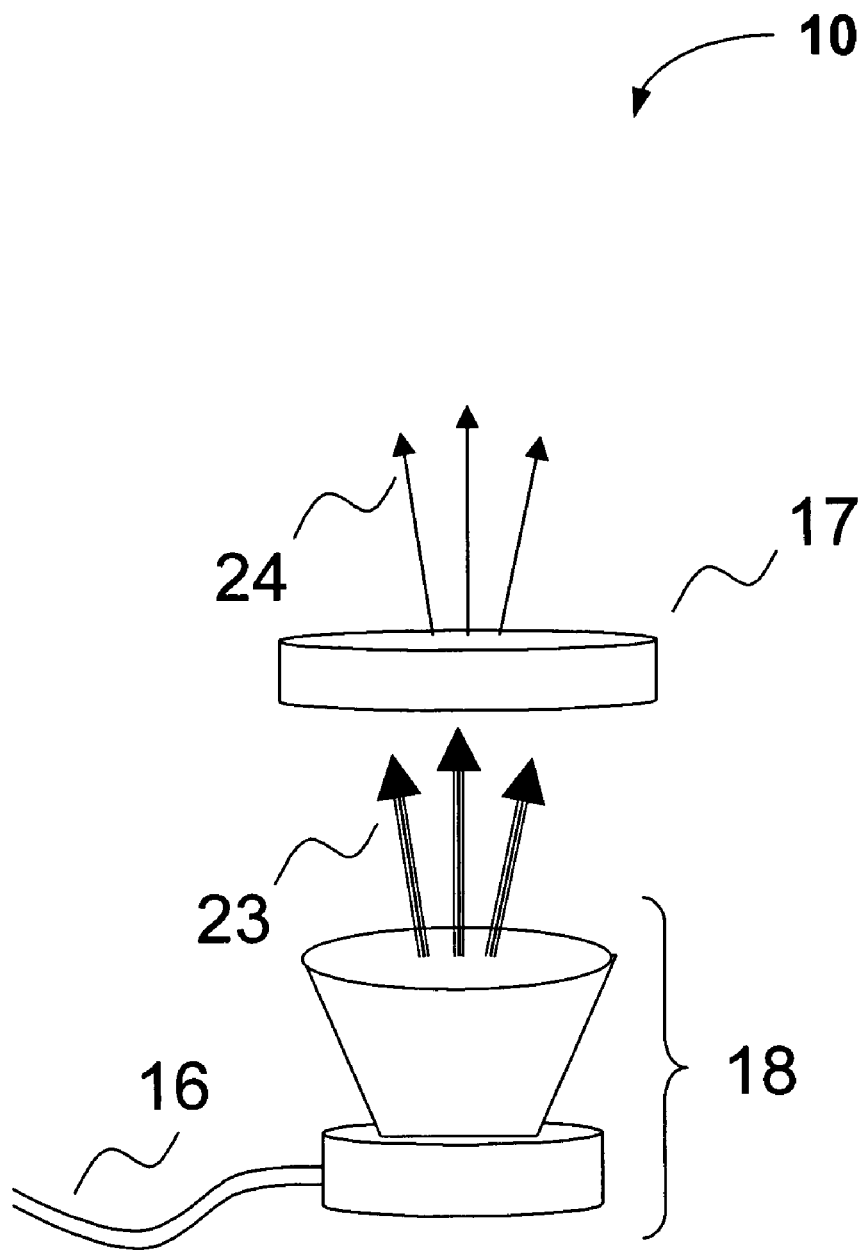
FIG. 3 is diagram showing an exemplary controllable radiation source, in accordance with an embodiment of the present invention.

FIG. 3 is a diagram showing an exemplary controllable radiation source 10, in accordance with an embodiment of the present invention. The exemplary controllable radiation source 10 includes a radiation filter 17 an electromagnetic radiation source 18 coupled to a controller via cable 16. The cable 16 connecting the controller to the electromagnetic radiation source 18 is a power cable carrying an adjustable current. This current powers the electromagnetic radiation source 18, which emits a relatively broad-spectrum beam of electromagnetic radiation 23. The electromagnetic radiation 23 passes through the radiation filter 17, which attenuates the wavelengths of light not in the desired wavelength band and emits radiation in the desired wavelength band 24.

By controlling the current through the cable 16 the emission of electromagnetic radiation in the desired wavelength band 24 can be adjusted as needed. The nature of the electromagnetic radiation source 18 depends on the wavelength range desired. In the visible light wavelength region, the electromagnetic radiation source 18 could be a high-intensity lamp; in the near infrared, the electromagnetic radiation source 18 could be an infrared lamp. Farther into the long infrared, heating elements can be employed as electromagnetic radiation sources 18. It should be noted that many other sources of controllable electromagnetic radiation can be employed in the process that comprises the present invention. Lasers, diffraction gratings, interferometers and holograms all can be employed as sources. This example is provided to show the immediate practicability of the overall process.

Figure 4:
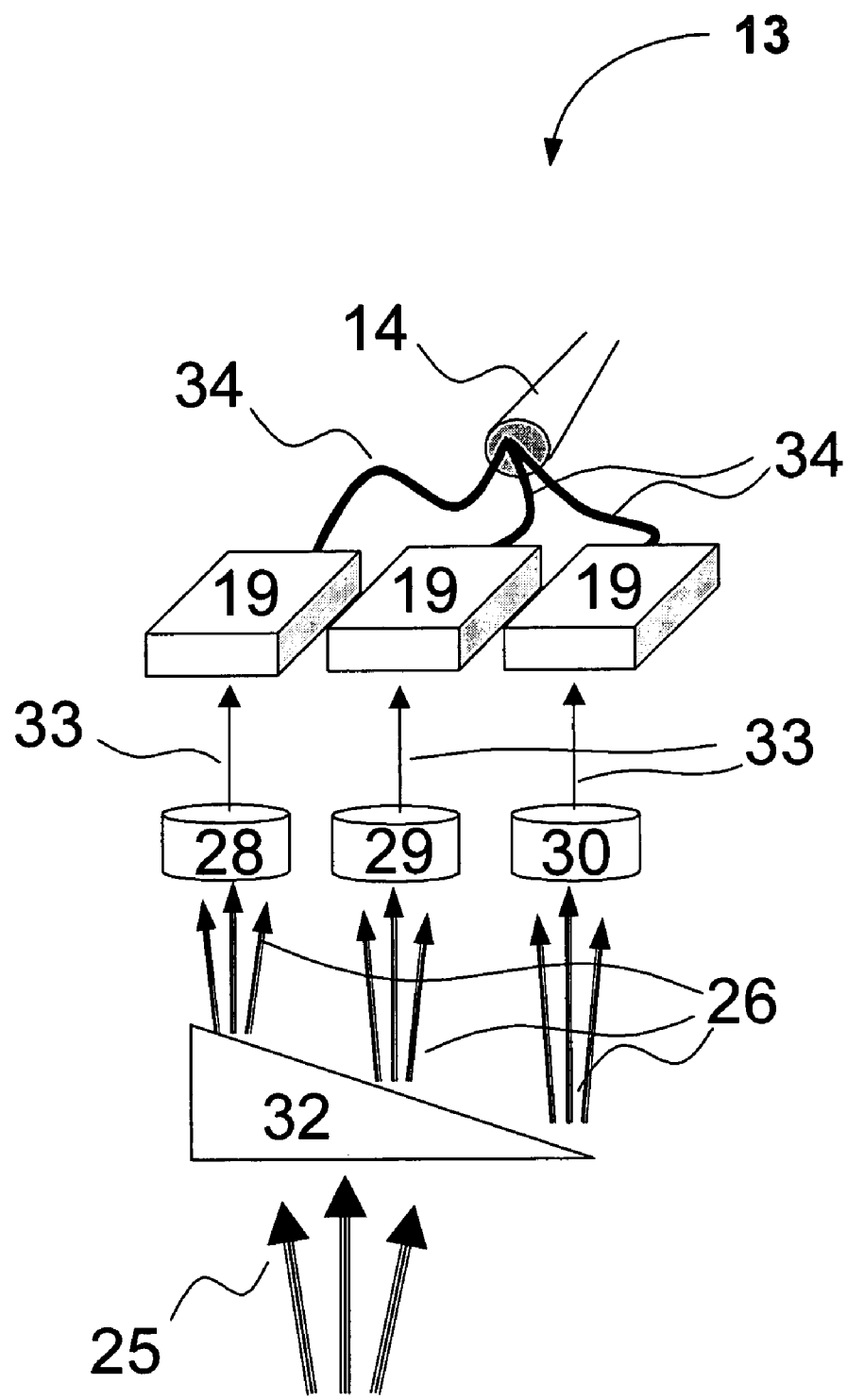
FIG. 4 is a diagram showing an exemplary camouflage sensor, in accordance with an embodiment of the present invention.

FIG. 4 is a diagram showing an exemplary camouflage sensor 13, in accordance with an embodiment of the present invention. It should be borne in mind that the exemplary camouflage sensor 13 illustrated in FIG. 4 can also be utilized as a surroundings sensor. The exemplary camouflage sensor 13 of FIG. 4 shows a three-wavelength-band sensor. In this example, the radiation received 25 at the sensor aperture passes through a beam splitter 32. The beam splitter 32 splits the received radiation 25 into separate beams 26 that are passed to three radiation filters 28, 29, 30, that attenuate the wavelengths outside their respective wavelength bands. The attenuated radiation beams 33 are passed to photoelectric cells 19 that generate a current proportional to the light intensity they receive. This generates a current through the individual wires 34 from each photoelectric cell. These signals are then delivered to the cable 14 that delivers them on to the controller.

The structure of the sensor receiving radiation from the camouflage and the structure of the sensor receiving radiation from the surroundings can be identical so the signals in each band can be readily compared. As above, it should be noted that there are many other types of sensors that can be employed in the process comprising the present invention. For example, any type of commercial spectrometer can be utilized for a camouflage or surroundings sensor if it operates in the wavelength bands of interest.

The descriptions above show one embodiment of the present invention, but many alternative implementations are possible. There are many controllable sources of radiation available in various wavelength ranges including lasers and various kinds of interference patterns (such as holograms). Laser systems are capable of firing beams of light across a wide field of view in a very short period of time; if this period of time is less than the "gather" time of the instrument observing the scene, then lasers can be used to write the spectral signature of the scene across the field of view in the same way that an electron gun writes its signal to a television screen within the "gather" time of the human eye.

For masking in the infrared region, the source of controllable electromagnetic radiation need not be concentrated at a point of beam emission. Grids of wires embedded in plastic filters can be controlled by electric-resistance heating; this again amounts to a controllable source of electromagnetic radiation.

Depending on the extent to which the radiation is generated by "point sources" (that is, concentrated sources of radiation), a diffusor may or may not be needed; therefore the diffusor is not an essential part of the invention. In many cases, the diffusor will act as a canopy over the object being camouflaged. The type of diffusing apparatus can vary by application. For most applications that include visible light, a mesh or screen can be used to scatter the radiation and make it more uniform. In one embodiment, the diffusor can have spectral characteristics that provide minimal interference with the spectral signature that is being produced, although the present invention can correct for considerable signature from the diffusor automatically by adjusting the intensity of radiation in the appropriate wavelength band.

Embodiments of the present invention provide many advantages. For example, the detail of spectral match between the camouflage signal and the surrounding terrain can be increased indefinitely by employing narrower wavelength bands. Further, the spectral resolution of the camouflage can be matched to the expected spectral resolution of the observing instruments. Moreover, a single camouflage system can be employed for all terrains without the need for different camouflage systems for different environments since the camouflage automatically adjusts its spectral signal to match any changes in the surroundings. Unlike systems that present images of the background, the present invention can operate outside the visible-light range of the human eye.

Embodiments of the present invention can be used to create camouflage that will match any desired spectral signature, and will automatically respond to changes in the surroundings. It replaces the need for several different types of camouflage to be produced for different environments, and it can function over a full range of wavelengths. Moreover, it can be matched to the perceived or expected resolution of camouflage-detecting instruments, thus producing a custom means of concealing a site or object from a particular type of detector.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for concealing an object, comprising:
   a plurality of electromagnetic radiation sources that generate an electromagnetic radiation spectrum;
   a camouflage sensor sensing the electromagnetic radiation generated by the plurality of electromagnetic radiation sources; and
   a controller in communication with the plurality of electromagnetic radiation sources and the camouflage sensor, the controller including logic that compares the sensed electromagnetic radiation spectrum generated from the plurality of electromagnetic radiation sources with an electromagnetic radiation spectrum from an environment surrounding the object,
   wherein the controller adjusts the plurality of electromagnetic radiation sources to generate an electromagnetic radiation spectrum that matches the electromagnetic radiation spectrum of the environment surrounding the object.

2. A system as recited in claim 1, wherein the camouflage sensor monitors an intensity at selected wavelengths of the electromagnetic radiation spectrum generated from the plurality of electromagnetic radiation sources.

3. A system as recited in claim 2, further comprising a surroundings sensor in communication with the controller, wherein the surroundings sensor monitors an intensity at selected wavelengths of the electromagnetic radiation spectrum received from the environment surrounding the object.

4. A system as recited in claim 3, wherein the controller adjusts each electromagnetic radiation source responsible for a particular wavelength to match the corresponding wavelength received from the surroundings sensor.

5. A system as recited in claim 1, wherein each electromagnetic radiation source comprises lamps of adjustable intensity with multiple filters.

6. A system as recited in claim 1, wherein each electromagnetic radiation source comprises heating elements of adjustable intensity with multiple filters.

7. A system as recited in claim 1, wherein each electromagnetic radiation source comprises a light source and an interference pattern.

8. A system as recited in claim 1, wherein each electromagnetic radiation source comprises a tunable laser.

9. A system as recited in claim 1, wherein each electromagnetic radiation source comprises a light source and a hologram.

10. A method for concealing an object, comprising the operations of:
generating a camouflage electromagnetic radiation spectrum;
sensing the camouflage electromagnetic radiation spectrum using a camouflage sensor;
receiving a surroundings electromagnetic radiation spectrum from an environment surrounding the object;
comparing the sensed camouflage electromagnetic radiation spectrum with the surroundings electromagnetic radiation spectrum; and
adjusting the camouflage electromagnetic radiation spectrum to match the surroundings electromagnetic radiation spectrum.

11. A method as recited in claim 10, sensing an intensity at selected wavelengths of the camouflage electromagnetic radiation spectrum using the camouflage sensor.

12. A method as recited in claim 11, sensing an intensity at selected wavelengths of the surroundings electromagnetic radiation spectrum using a surroundings sensor.

13. A method as recited in claim 12, decreasing the intensity at each selected wavelength in the camouflage electromagnetic radiation spectrum when the intensity at the selected wavelength is greater than the intensity at a corresponding wavelength in the surroundings electromagnetic radiation spectrum.

14. A method as recited in claim 12, increasing the intensity at each selected wavelength in the camouflage electromagnetic radiation spectrum when the intensity at the selected wavelength is less than the intensity at a corresponding wavelength in the surroundings electromagnetic radiation spectrum.

15. A system for concealing an object, comprising:
a plurality of electromagnetic radiation sources that generate an electromagnetic radiation spectrum;
a camouflage sensor sensing the electromagnetic radiation generated by the plurality of electromagnetic radiation sources; and
a controller in communication with the plurality of electromagnetic radiation sources and the camouflage sensor, the controller including logic that compares the sensed electromagnetic radiation spectrum generated from the plurality of electromagnetic radiation sources with an electromagnetic radiation spectrum from a decoy material,
wherein the controller adjusts the plurality of electromagnetic radiation sources to generate an electromagnetic radiation spectrum that matches the electromagnetic radiation spectrum of the decoy material.

16. A system as recited in claim 15, wherein the camouflage sensor monitors an intensity at selected wavelengths of the electromagnetic radiation spectrum generated from the plurality of electromagnetic radiation sources.

17. A system as recited in claim 16, further comprising a surroundings sensor in communication with the controller, wherein the surroundings sensor monitors an intensity at selected wavelengths of the electromagnetic radiation spectrum received from the decoy material.

18. A system as recited in claim 17, wherein the controller adjusts each electromagnetic radiation source responsible for a particular wavelength to match the corresponding wavelength received from the surroundings sensor.

19. A system as recited in claim 15, wherein each electromagnetic radiation source comprises lamps of adjustable intensity with multiple filters.

20. A system as recited in claim 15, wherein each electromagnetic radiation source comprises heating elements of adjustable intensity with multiple filters.

* * * * *